United States Patent
Edwards et al.

(10) Patent No.: US 10,218,248 B2
(45) Date of Patent: Feb. 26, 2019

(54) SGENX-1000A ROTOR LIFTING DEVICE

(71) Applicant: Siemens Energy, Inc., Orlando, FL (US)

(72) Inventors: James B. Edwards, Sanford, FL (US); Cezar Cisloiu, Monroeville, PA (US)

(73) Assignee: SIEMENS ENERGY, INC., Orlando, FL (US)

( * ) Notice: Subject to any disclaimer, the term of this patent is extended or adjusted under 35 U.S.C. 154(b) by 342 days.

(21) Appl. No.: 14/722,210

(22) Filed: May 27, 2015

(65) Prior Publication Data
US 2016/0380519 A1 Dec. 29, 2016

(51) Int. Cl.
| | | |
|---|---|---|
| *H02K 15/00* | (2006.01) | |
| *B66F 3/08* | (2006.01) | |
| *B66F 3/24* | (2006.01) | |
| *F16C 17/02* | (2006.01) | |
| *F16C 35/06* | (2006.01) | |

(52) U.S. Cl.
CPC ............ *H02K 15/0006* (2013.01); *B66F 3/08* (2013.01); *B66F 3/24* (2013.01); *F16C 35/062* (2013.01); *F16C 17/02* (2013.01); *F16C 2360/00* (2013.01); *F16C 2380/26* (2013.01)

(58) Field of Classification Search
CPC .... B66F 3/24; B66F 3/38; F01D 25/16; F01D 25/28; F01D 25/285; F16C 35/06; F16C 35/062
See application file for complete search history.

(56) References Cited

U.S. PATENT DOCUMENTS

| | | | | |
|---|---|---|---|---|
| 4,925,363 A | * | 5/1990 | Brown | F01D 25/26 384/547 |
| 6,386,810 B1 | * | 5/2002 | Onoe | F16B 33/06 411/411 |
| 7,320,570 B2 | * | 1/2008 | Czarnek | F16B 35/005 411/392 |
| 7,946,554 B2 | * | 5/2011 | Sassatelli | F16C 13/04 248/346.2 |
| 9,032,599 B2 | * | 5/2015 | Spanos | F01D 25/285 29/252 |

(Continued)

FOREIGN PATENT DOCUMENTS

| | | | | |
|---|---|---|---|---|
| JP | 53051349 | | 5/1978 | |
| JP | 53051349 A | * | 5/1978 | ............... F16C 17/24 |
| JP | 60237224 A | * | 11/1985 | ............ H02K 5/1732 |

(Continued)

OTHER PUBLICATIONS

PCT International Search Report and Written Opinion dated Aug. 5, 2016 corresponding to PCT Application No. PCT/US2016/032833 filed May 17, 2016 (11 pages).

*Primary Examiner* — Tyrone V Hall, Jr.

(57) ABSTRACT

A lifting tool for lifting a rotor associated with a generator so as to allow a rotor bearing to be removed from a bearing pedestal beneath the rotor. The tool includes a semi-circular base portion that is bolted to the bearing pedestal and a pair of jack screws mounted to the base portion. A hydraulic ram is mounted to the base portion between the jack screws and is positioned against the rotor when the tool is bolted to the bearing pedestal. The ram is used to lift the rotor away from the bearing and the jack screws are used to hold the rotor up once it is in the desired location, where the ram is then lowered.

16 Claims, 3 Drawing Sheets

(56) References Cited

U.S. PATENT DOCUMENTS

2015/0226265 A1\* 8/2015 Bourgeois ............. F16C 35/062
                                                    414/800
2016/0052756 A1\* 2/2016 Yamasue ................ F16C 17/24
                                                    254/93 R

FOREIGN PATENT DOCUMENTS

| JP | 61054846 A | \* | 3/1986 | ......... H02K 15/0006 |
| JP | S6154846 A | | 3/1986 | |
| JP | 2504127 Y2 | | 7/1996 | |
| JP | 2011021541 A | | 2/2011 | |
| JP | 2012062872 A | | 3/2012 | |
| JP | 2014240645 A | | 12/2014 | |

\* cited by examiner

SGENX-1000A ROTOR LIFTING DEVICE

BACKGROUND OF THE INVENTION

Field of the Invention

This invention relates generally to a lifting tool for lifting a rotor coupled to a generator so as to allow a rotor bearing to be removed from under the rotor and, more particularly, to a lifting tool for lifting a generator rotor so as to allow a rotor bearing to be removed from under the rotor, where the tool is bolted to a bearing pedestal, and where the tool includes a hydraulic ram that lifts the rotor and a pair of jack screws that hold the lifted rotor.

Discussion of the Related Art

High voltage generators for generating electricity as a power source are well known in the art. A power plant may be a nuclear or fossil heat source that rotates a turbine shaft by the expansion of a working gaseous fluid across turbine blades that in turn cause the shaft to rotate. The turbine shaft is coupled to an input shaft of a high voltage generator that is mounted to a rotor having a special configuration of coils. An electrical current provided in the rotor coils generates a magnetic flux around the coils, and as the rotor rotates, the magnetic flux interacts with windings in a stator core enclosing the rotor, which generates a current flow in the windings.

In one power plant type the generator rotor extends from the generator and is coupled to the turbine shaft. The generator rotor is supported by and extends through a rotor bearing, which is an annular bulk of metal having a central bore with an inner surface on which the rotor rotates.

The rotor bearing is mounted within a bearing housing that is part of a bearing pedestal supported on the turbine foundation. Oil is pumped into the bearing housing, which provides a film of oil on the inner surface of the bore that slightly lifts the rotor relative thereto, thus allowing the rotor to effortlessly turn within the bore.

The generator requires periodic maintenance where the generator is shut down and various maintenance procedures are performed, such as cleaning, wear detection, part replacement, part inspection, etc. Some of these maintenance procedures require that the rotor bearing be removed from the bearing housing and inspected and possibly replaced. This generally requires partial disassembly of the pedestal including removal of a housing cap, end seals, etc. from the housing to expose the bearing. A typical rotor bearing of this type will include two bearing half sections, where a bottom bearing half section sits below the rotor and a top bearing half section is exposed when the housing cap is removed. The top half section is first removed from the rotor, and the bottom half section is then rotated around the rotor and subsequently removed.

During removal and inspection of the bearing, the weight of the rotor is resting on the bottom bearing half section, which prevents it from being easily removed. Thus, the rotor needs to be slightly lifted off of the bottom half section. One known procedure for lifting the rotor includes mounting a saddle and jack screw tool to the rotor proximate to the bearing pedestal. The saddle includes a pair of legs that are mounted on the turbine foundation and a cross-member that includes a jack screw. Once the cross-member is positioned below the rotor, the jack screw is used to apply lifting pressure to the rotor to lift the rotor off of the bottom bearing half section and hold it in the lifted position.

The saddle and jack screw tool referred to above is a large and robust device that requires significant room to be properly deployed. However, for certain generator designs, there is not enough space around the bearing pedestal to position the tool, which thus requires that many large, heavy and complex components to be disassembled and removed to make room for the tool. Further, the turbine foundation may be elevated or awkwardly shaped, which requires special supports to be used in connection with the tool. Thus, there is a need in the art for a lifting tool for lifting the rotor that is better able to accommodate the generator environment.

SUMMARY OF THE INVENTION

The following discussion describes a lifting tool for lifting a rotor associated with a generator so as to allow a rotor bearing to be removed from a bearing pedestal beneath the rotor. The tool includes a semi-circular base portion that is bolted to the bearing pedestal and a pair of jack screws mounted to the base portion. A hydraulic ram is mounted to the base portion between the jack screws and is positioned against the rotor when the tool is bolted to the bearing pedestal. The ram is employed to lift the rotor away from the bearing and the jack screws are employed to hold the rotor up once it is in the desired location, where the ram is then lowered.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a lifting tool for lifting a rotor extending through a bearing is merely exemplary in nature, and is in no way intended to limit the invention or its applications or uses. For example, as will be discussed below, the tool has particular application for lifting a generator rotor. However, as will be appreciated by those skilled in the art, the tool also has applicability to lift a turbine rotor, or some other type of rotor.

Figure 1:
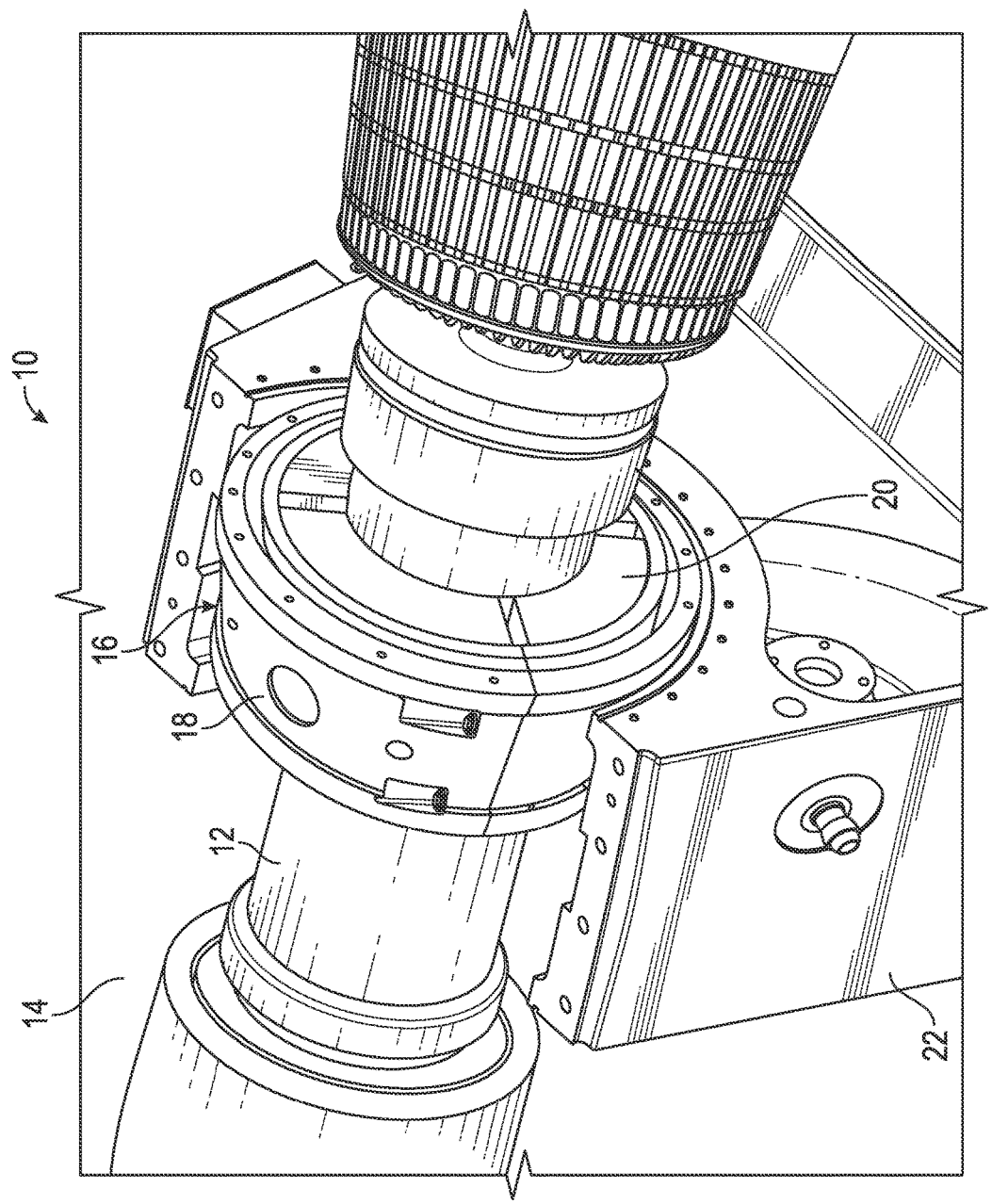
FIG. 1 is a cut-away, isometric view of a generator assembly showing a rotor extending from the generator through a bearing positioned on a bearing pedestal.

FIG. 1 is a cut-away, isometric view of a generator assembly 10 showing a generator rotor 12 extending from an end of a generator 14. The generator 14 can be any generator of the type discussed herein used in combination with any power plant, such as a gas turbine engine, steam turbine engine, etc. The rotor 12 extends through a bearing 16 having two bearing half sections 18 and 20 of the type discussed above that supports the rotor 12 and allows it to freely rotate. The bearing 16 is positioned within a bearing pedestal 22, where front and back end seals of the bearing pedestal and a top cover have been removed from the pedestal 22 to expose the bearing 16. The configuration of the assembly 10 as shown and described is well known to those skilled in the art.

Figure 2:
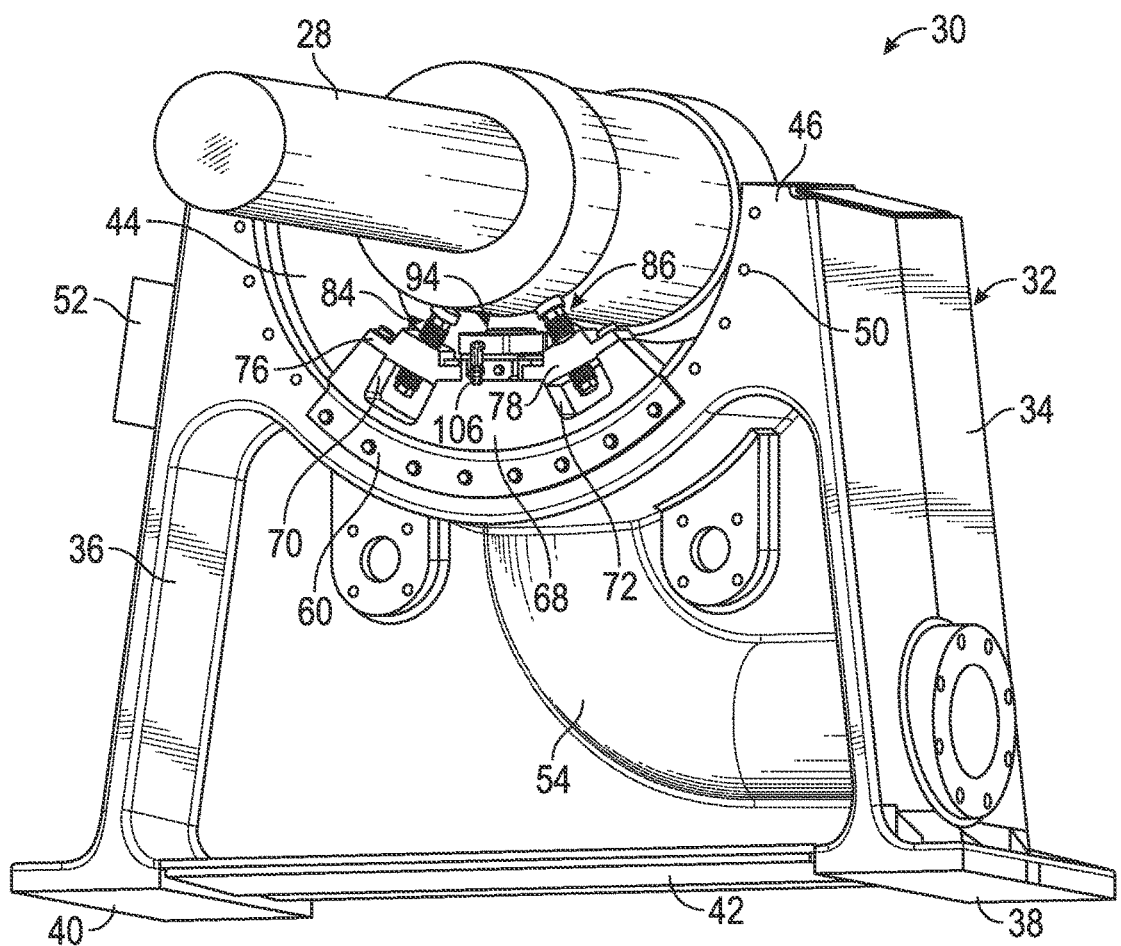
FIG. 2 is an isometric view of a bearing pedestal and a rotor lifting tool mounted thereto relative to a rotor.

FIG. 2 is an isometric illustration 30 of a partially disassembled bearing support pedestal 32, where the bearing has been removed. The pedestal 32 is an assembly of various metal components and parts welded and bolted together in a desired configuration for a particular bearing. The pedestal 32 includes a pair of side support legs 34 and 36 having feet 38 and 40, respectively, that are configured to sit on a turbine foundation, and a support member 42 extending therebetween. The support legs 34 and 36 are joined to a U-shaped bearing support portion 44 that defines part of an enclosure in which the bearing is mounted. The pedestal 32 also includes front and back end seals and a cover cap that are not shown in FIG. 2, where the front end seal is mounted to a front face 46 of the U-shaped portion 44 by bolts threaded into bolt holes 50. During operation, the enclosure is filled with a pressurized oil that enters the enclosure through input port 52 and can be drained from the enclosure through drain pipe 54.

Figure 3:
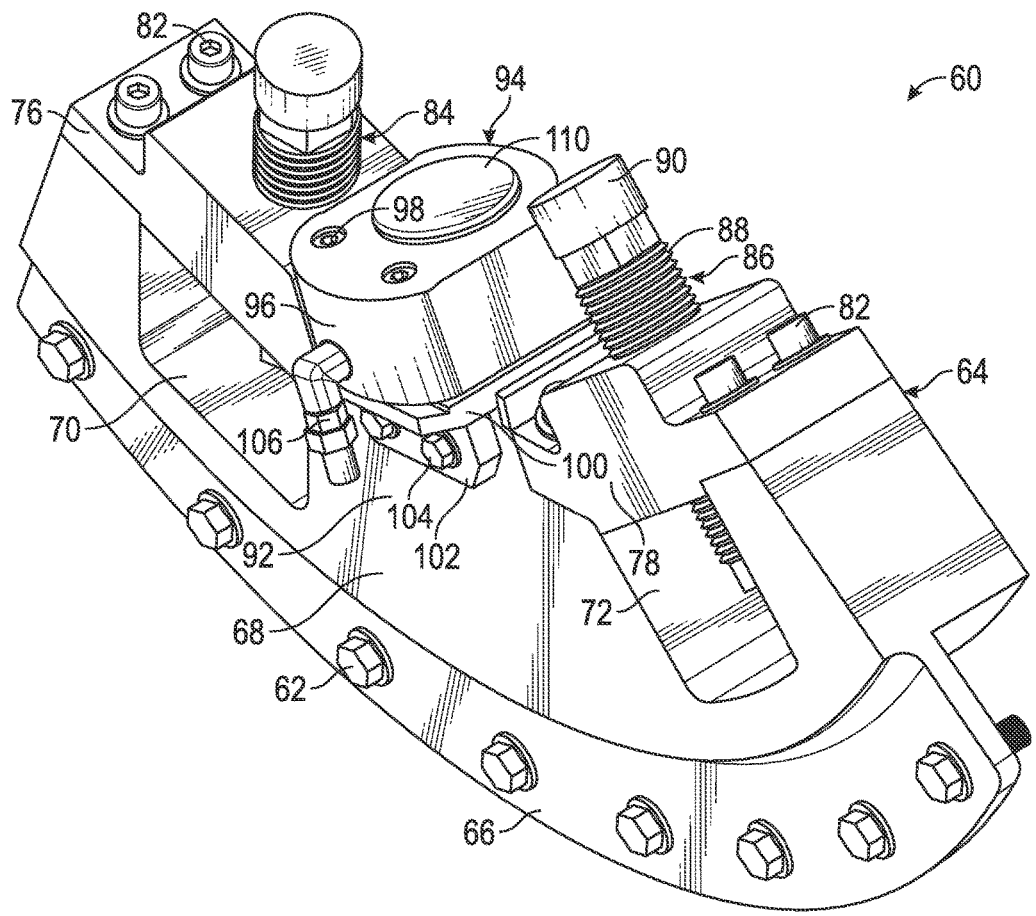
FIG. 3 is an isometric view of the lifting tool removed from the bearing pedestal.
Figure 4:
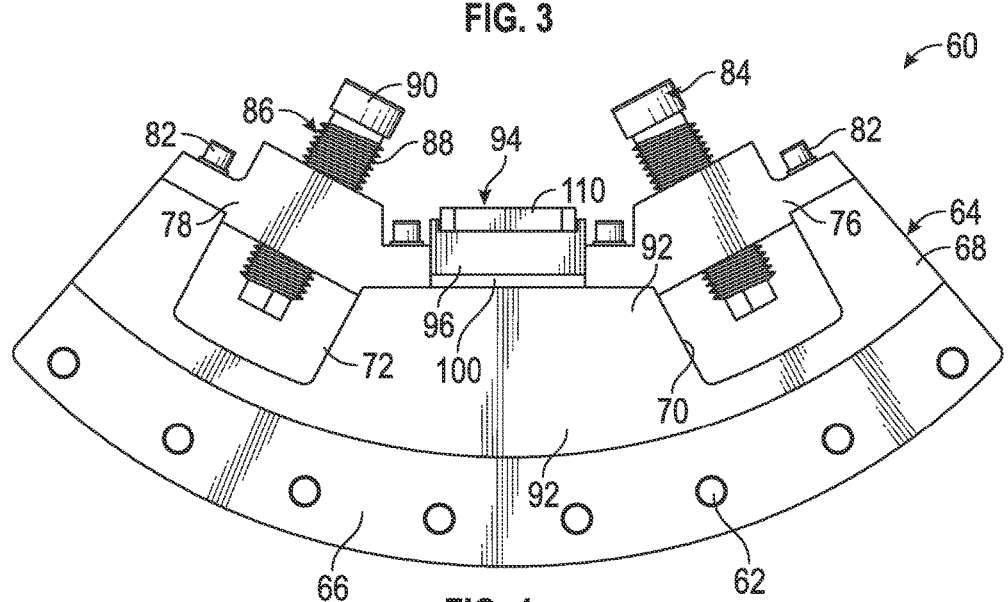
FIG. 4 is a rear view of the lifting tool.

A rotor 28 is shown being supported by a rotor lifting tool 60 that is mounted to the front face 46 of the U-shaped portion 44 by bolts 62 using the bolt holes 50. FIG. 3 is a front isometric view and FIG. 4 is a rear view of the tool 60 removed from the pedestal 32. The tool 60 includes a solid semi-circular base piece 64 having a mounting flange 66 and a structural portion 68, where the piece 64 has a curvature that follows the curvature of the opening of the U-shaped portion 44. In one non-limiting embodiment, the base piece 64 is an aluminum plate piece being formed in a suitable manner that provides the desired strength and robustness, but is relatively light weight. The structural portion 68 includes cut-out sections 70 and 72 that are open at their top surface. A pair of specially shaped jack screw pieces 76 and 78 are bolted to a top surface 80 of the structural portion 68 by bolts 82 and extend across the cut-out sections 70 and 72, respectively, as shown. In one non-limiting embodiment, the pieces 76 and 78 are formed from steel plate pieces. The tool 60 also includes a pair of jack screws 84 and 86 each including a threaded shaft 88 and a support tip 90 mounted thereto, where the shaft 88 is threaded through suitable bores in the jack screw pieces 76 and 78, respectively, and partially extends into the cut-out sections 70 and 72. The shafts 88 can be steel shafts and the support tips 90 can be made of a softer metal than the shafts 88, such as a brass alloy, so as to not damage the rotor 28. The structural portion 68 also includes a center portion 92 to which a hydraulic ram assembly 94 is mounted. The ram assembly 94 includes an outer housing 96 bolted to the center portion 92 of the structural portion 68 by bolts 98, where a plate 100 is positioned therebetween, and where a front plate 102 is bolted to a front surface of the structural portion 68 by bolts 104. A hydraulic connector 106 is mounted to the housing 96 to allow hydraulic fluid under pressure to be brought into a chamber (not shown) within the housing 96 to lift a ram piston 110. A shim plate (not shown) made of a suitable soft metal, such as a brass alloy, can be provided on top of the housing 96 to prevent the rotor 28 from being damaged.

During disassembly and inspection of the bearing, the end seals and the top cap are removed from the pedestal 32. The top half section of the bearing is then removed and the tool 60 is bolted to the side of the bearing support portion 44. A hydraulic line is then coupled to the connector 106 and hydraulic pressure is provided to lift the rotor 28 off the bottom bearing half section. The jack screws 84 and 86 are then rotated upward using the threaded shaft 88 to hold the rotor 28 in place, and the hydraulics pressure is removed to lower the ram piston 110. The bottom bearing half section of the bearing is then free to rotate, and can be removed for inspection.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A lifting tool assembly for lifting a rotor associated with a power generator, said tool assembly being mountable to a bearing pedestal having an enclosure that houses a bearing through which the rotor extends, said tool assembly comprising:
    a base portion operable to be mounted to the bearing pedestal, wherein the base portion comprises a mounting flange and a structure portion, wherein the mounting flange is mounted to a front face of the enclosure, wherein the structure portion is disposed in opening of the enclosure, and wherein the structure portion comprises a first cut-out section, a second cut-out section and a center portion;
    a first jack screw piece bolted to a top surface of the structure portion and extending across the first cut-out section and a second jack screw piece bolted to the top surface of the structure portion and extending across the second cut-out section;
    a first jack screw threadably mounted to the first jack screw piece and partially extending into the first cut-out section and a second jack screw threadably mounted to the second jack screw piece and partially extending into the second cut-out section; and
    a hydraulic assembly mounted to the center portion of the structure portion and including a hydraulic ram, wherein the hydraulic ram is operable to lift the rotor and the first and second jack screws are operable to hold the rotor in a lifted position,
    wherein the center portion comprises a continuous top surface on which the hydraulic ram is mounted, and
    wherein the hydraulic ram is mounted on a plate which is bolted to the center portion.

2. The lifting tool assembly according to claim 1 wherein the base portion has a semi-circular configuration.

3. The lifting tool assembly according to claim 2 wherein a curvature of the semi-circular base portion follows a curvature of a support portion of the bearing pedestal.

4. The lifting tool assembly according to claim 1 wherein the hydraulic assembly is mounted to the center portion between the first and second jack screw pieces.

5. The lifting tool assembly according to claim 1 wherein the first and second jack screw pieces are bolted to the base portion.

6. The lifting tool assembly according to claim 1 wherein the base portion is an aluminum member.

7. The lifting tool assembly according to claim 1 wherein each jack screw includes a threaded steel shaft.

8. The lifting tool assembly according to claim 7 wherein each jack screw includes a support tip being made of a softer metal than the steel shaft.

9. The lifting tool assembly according to claim 1 further comprising a rotor shim positioned between the hydraulic ram and the rotor.

10. A lifting tool assembly for lifting a rotor, said tool assembly being mountable to a bearing pedestal having an enclosure that houses a bearing through which the rotor extends, said tool assembly comprising:
- a base portion operable to be mounted to the bearing pedestal, wherein the base portion comprises a mounting flange and a structure portion, wherein the mounting flange is mounted to a front face of the enclosure, and wherein the structure portion is disposed in opening of the enclosure;
- at least one jack screw mounted to the structure portion; and
- a hydraulic assembly mounted to the structure portion and including a hydraulic ram, wherein the hydraulic ram is operable to lift the rotor and the at least one jack screw is operable to hold the rotor in a lifted position,
- wherein the center portion comprises a continuous top surface on which the hydraulic ram is mounted, and
- wherein the hydraulic ram is mounted on a plate which is bolted to the center portion.

11. The lifting tool assembly according to claim 10 wherein the at least one jack screw is two jack screws, said hydraulic assembly being positioned between the two jack screws.

12. The lifting tool assembly according to claim 11 wherein the base portion has a semi-circular configuration.

13. The lifting tool assembly according to claim 12 wherein a curvature of the semi-circular base portion follows a curvature of a support portion of the bearing pedestal.

14. The lifting tool assembly according to claim 10 further comprising a rotor shim positioned between the hydraulic ram and the rotor.

15. A lifting tool assembly for lifting a rotor associated with a power generator, said tool assembly being mountable to a bearing pedestal having an enclosure that houses a bearing through which the rotor extends, said tool assembly comprising:
- a semi-circular base portion operable to be mounted to the bearing pedestal by bolts, where a curvature of the semi-circular base portion follows a curvature of a support portion of the bearing pedestal, said base portion including a mounting flange through which the bolts extend into a front face of the bearing pedestal, said base portion including a structure portion disposed in opening of the support portion of the bearing pedestal, and said structure portion including a first cut-out section, a second cut-out section and a center portion;
- a first jack screw piece bolted to the structure portion and extending across the first cut-out section and a second jack screw piece bolted to the structure portion and extending across the second cut-out section;
- a first jack screw threadably mounted to the first jack screw piece and partially extending into the first cut-out section and a second jack screw threadably mounted to the second jack screw piece and partially extending into the second cut-out section; and
- a hydraulic assembly mounted to the center portion between the first and second jack screw pieces and including a hydraulic ram, wherein the hydraulic ram is operable to lift the rotor and the first and second jack screws are operable to hold the rotor in a lifted position,
- wherein the center portion comprises a continuous top surface on which the hydraulic ram is mounted, and
- wherein the hydraulic ram is mounted on a plate which is bolted to the center portion.

16. The lifting tool assembly according to claim 15 wherein the base portion is an aluminum member and each of the first and second jack screw pieces includes a threaded steel shaft and brass alloy tip mounted thereto.

* * * * *